(12) United States Patent
Schmidt et al.

(10) Patent No.: US 10,427,728 B2
(45) Date of Patent: Oct. 1, 2019

(54) AIR CONDUCTION ELEMENT FOR REDUCING AIR RESISTANCE OF A LOAD-CARRYING VEHICLE

(71) Applicant: JOST-WERKE DEUTSCHLAND GMBH, Neu-Isenburg (DE)

(72) Inventors: Dirk Schmidt, Limburg (DE); Martin Richter, Frankfurt am Main (DE); José Manuel Algüera, Aschaffenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 56 days.

(21) Appl. No.: 15/576,026

(22) PCT Filed: Jun. 8, 2016

(86) PCT No.: PCT/EP2016/063043
§ 371 (c)(1),
(2) Date: Nov. 21, 2017

(87) PCT Pub. No.: WO2016/198455
PCT Pub. Date: Dec. 15, 2016

(65) Prior Publication Data
US 2018/0154951 A1    Jun. 7, 2018

(30) Foreign Application Priority Data
Jun. 9, 2015    (DE) .................. 10 2015 210 500

(51) Int. Cl.
*B62D 35/00* (2006.01)
*F15D 1/10* (2006.01)
*F15D 1/14* (2006.01)

(52) U.S. Cl.
CPC ......... *B62D 35/001* (2013.01); *B62D 35/007* (2013.01); *F15D 1/10* (2013.01); *F15D 1/14* (2013.01)

(58) Field of Classification Search
CPC ....... B62D 35/001; B62D 35/007; F15D 1/10; F15D 1/14
See application file for complete search history.

(56) References Cited

U.S. PATENT DOCUMENTS 3,960,402 A * 6/1976 Keck ................... B62D 35/001
296/180.4
4,316,630 A * 2/1982 Evans .................. B62D 35/001
296/180.2
(Continued)

FOREIGN PATENT DOCUMENTS

EP          1860023 A2    11/2007
WO     2006060852 A1     6/2006

*Primary Examiner* — Hilary L Gutman
(74) *Attorney, Agent, or Firm* — Hudak, Shunk & Farine Co. LPA

(57) ABSTRACT

An air conduction element for reducing the air resistance of a load-carrying vehicle having a load space structure. The air conduction element can be externally mounted in the rear region of the load space structure and includes an air conduction duct with a front air inlet opening and a rear air outlet opening, front and rear being in relation to the direction of travel (x). The air inlet opening overlaps the load space structure in the direction of travel (x) and the air outlet opening is arranged behind the load space structure within the cross-sectional contour thereof. The air conduction element has a cover which delimits the air conduction duct. It was therefore the aim to devise an air conduction element which does not increase the dimensions of the load space structure when the vehicle is driving slowly or is at a standstill. For this purpose, the cover is produced from a flexible flat material.

19 Claims, 2 Drawing Sheets

(56) References Cited

U.S. PATENT DOCUMENTS

| | | | | |
|---|---|---|---|---|
| 4,320,920 | A * | 3/1982 | Goudey | B62D 35/001 296/180.4 |
| 4,978,162 | A * | 12/1990 | Labbe | B62D 35/004 296/180.2 |
| 5,171,057 | A * | 12/1992 | Sharp | B60S 1/56 296/180.4 |
| 5,280,990 | A * | 1/1994 | Rinard | B62D 35/001 296/180.1 |
| 5,375,903 | A * | 12/1994 | Lechner | B62D 35/001 296/180.1 |
| 8,360,509 | B2 | 1/2013 | Smith et al. | |
| 2007/0001481 | A1 | 1/2007 | Breidenbach | |
| 2011/0068603 | A1 | 3/2011 | Domo et al. | |

* cited by examiner

AIR CONDUCTION ELEMENT FOR REDUCING AIR RESISTANCE OF A LOAD-CARRYING VEHICLE

FIELD OF THE INVENTION

The invention concerns an air conduction element for reducing the air resistance of a load-carrying vehicle having a cargo space structure, which can be externally mounted in the rear region of the cargo space structure and comprises an air conduction duct with a front air inlet opening and a rear air outlet opening in the direction of travel, wherein the air inlet opening overlaps the cargo space structure in the direction of travel and the air outlet opening is arranged behind the cargo space structure within its cross section contour, wherein the air conduction element comprises a cover which delimits the air conduction duct.

BACKGROUND OF THE INVENTION

By a load-carrying vehicle is meant in particular trucks and their trailers, as well as buses. The load-carrying vehicle always has a cargo space structure, which contains the goods or persons intended for the transport. The cargo space structure is bounded by fully or partly enclosed side walls and a roof wall. During rapid forward travel of the load-carrying vehicle, a negative pressure arises in the region behind the cargo space structure, resulting in a suction effect and increasing the fuel consumption of the load-carrying vehicle.

In the prior art there have been many attempts to lengthen the contour of the tail by means of a cone formed on it, so that the air flowing across the cargo space structure lies against the cone and thereby reduces the suction effect. Thus, US 2011/0068603 A1 proposes placing a tubular bulge at the rear of the load-carrying vehicle, which almost entirely surrounds the contour of the cargo space structure in the circumferential direction.

U.S. Pat. No. 8,360,509 B2, on the other hand, discloses the use of foldable wall elements in place of a tubular bulge, while US 2007/0001481 A1 proposes an enclosed cone which is telescopic in the axial direction.

What all these devices have in common is that the air conducting surfaces forming the cone are arranged solely behind the cargo space structure so as not to further increase the coefficient of air resistance.

The major drawback of these rear-side air conducting surfaces is that the cargo space structure can only be unloaded with major expense, since its rear doors can only be opened after a prior disassembly of the air conducting surfaces. Furthermore, on account of the rear-side mounting of the air conducting surfaces, the permissible vehicle length is significantly exceeded, so that it is necessary to shorten the effectively usable cargo space structure.

EP 1 860 023 A2 proposes taking up the air flow across the cargo space structure during travel by means of a rigid-shape, tubular structure and channeling it to the negative pressure region located behind the tail. However, the tubular structure has proven to be a drawback, since it results in greater height of the vehicle, which may result in contact with the roof of the cargo terminal during maneuvering at roofed cargo terminals and corresponding damage to both the roof and the tubular structure. The height of the tubular structure cannot be seen from the driver's cabin on account of being mounted at the rear and at the top side of the cargo space structure and therefore it is difficult to estimate it.

For this reason, the problem which is invention proposes to solve was to develop an air conduction element which only slightly increases the cross section of the cargo space during slow travel and which has an effective air conduction duct during faster travel.

SUMMARY OF THE INVENTION

The problem is solved according to the invention with an air conduction element comprising a cover that is produced from a flexible flat structure.

The cover made from a flexible flat structure is arranged movable with respect to the cargo space structure. Upon falling below a predetermined air speed, an internal cross section of the air conduction duct is blown open by the air flow so that the cover is lifted from the cargo space structure and the internal cross section of the air conduction duct is passable. Upon falling below a predetermined air speed, the cover collapses in the direction of the cargo space structure so that an internal cross section of the air conduction duct is decreased at least for a portion with respect to the internal cross section when the cover is lifted, or it is no longer present. The flexible flat structure produces no three-dimensional shape with an air conduction duct passable to the air flow at an air speed less than the predetermined speed.

By a movable arrangement of the cover with respect to the cargo space structure is meant a mounting making possible in particular a blowing out of the cover relatively to the closest wall of the cargo space structure such that the air conduction duct has an increased clear cross section in this extended position. The lowering or the position of the cover spaced apart from the cargo space structure occurs preferably entirely by means of the air flow sweeping over the load-carrying vehicle so that no further subassemblies or control units are needed. Since the air resistance is negligible in any case during maneuvering, the air conduction element can remain in the lowered position during slow driving and thus requires slight structural room. With faster driving, the influence of the air conduction element increases, but then there are few obstacles reaching into the roadway space.

The device according to the invention is fastened especially preferably to a roof wall of the cargo space structure, wherein the air resistance can be further decreased when the other walls of the cargo space structure, such as the side walls, are provided the device.

The cover terminates in the vehicle longitudinal direction above the rear end of the cargo space structure or goes beyond it.

By a flexible flat structure is meant a fabric or a film, which collapses onto itself in the unloaded state. The benefit of this embodiment is that, upon falling below the air speed, the air conduction element causes no significant increased height of the vehicle, but instead lies flat against the cargo space structure. In order to reduce pressure losses at the sides, the cover should be joined tightly to the cargo space structure at both lateral end sections over its entire length.

Unlike a spoiler arranged at the rear of the cargo space structure, the air conduction duct of the air conduction element is preferably substantially closed in the circumferential direction and has at best small-area openings for pressure relief, which pass only partly through the cover or the side walls, if present, in the direction of travel.

Advisedly, the cover is held by means of spacing elements on the cargo space structure. The spacing elements restrict the lifting up of the cover above the corresponding air speed. In this way, the cover is secured not only in its side regions, but also at many points transversely to the direction of travel, so that the load is significantly reduced in the side regions of the cover.

For this, the spacing elements may engage with the cover and the cargo space structure and should be flexible and of such dimension in the direction of movement of the cover that a complete lowering and raising of the cover is possible.

Advantageously, the spacing elements are formed as belts or cables, having a relatively slight air resistance.

Alternatively or additionally to belts or cables, the spacing elements may also be ribs extending substantially in the direction of travel. With the aid of the ribs, the air flow entering by the air inlet opening is guided into the air conduction duct and a homogeneous back pressure is established inside the air conduction duct. In this way, in particular the risk of a collapsing of the cover in its marginal side regions is decreased.

Preferably, the ribs are likewise made from a flexible flat structure and are therefore suitable to allowing a lowering or raising of the cover.

Favorably, an apron extending as far as the air outlet opening is fastened to the cover. The apron lengthens the air conduction duct especially up to the region situated behind the cargo space structure opposite the direction of travel. For this, the apron forms a bend relative to the substantially longitudinally extending air conduction duct, by which the air flow arrives in the region behind the cargo space structure and having a negative pressure during the travel. The apron is mounted by its first end permanently on the cover and spans the air outlet opening with its opposite second end. The air conduction duct is defined by the cover and the apron.

Insofar as the apron is made from a rigid-shape material, the air outlet opening migrates up and down in the vertical direction together with the cover. For this, it is advisable to secure the apron to the cargo space structure by means of a guide in the direction of movement.

Preferably, the apron may also be made from a flexible flat structure. In this embodiment, the movement of the cover is decoupled from the air outlet opening, so that this always remains stationary behind the cargo space structure. During slow driving or standstill of the load carrying vehicle, the apron composed of a flexible flat structure collapses on itself.

According to one especially advantageous embodiment, elastic clasps are arranged in the air inlet opening, extending from the cover to the cargo space structure. The elastic clasps become reversibly deformed under the load of the cover and assist the lifting of the cover and its detachment from the cargo space structure when a buoyancy of the cover is created by air flow. In this way, even at comparatively slow travel of the load-carrying vehicle, there is already a favorable filling of the air conduction duct by the air flow and thus a timely lifting of the cover.

Preferably the cover is formed with an airfoil. By an airfoil is meant in fluid dynamics the shape of the cross section of a body in the direction of flow. Forces acting on this body are created by the specific shape and the flow of a liquid or gas around the body. An airfoil is especially suitable for creating dynamic lift during slight flow resistance.

The airfoil may be formed by the flexible flat structure, the airfoil being formed only when a sufficiently large air flow is present.

Advisedly, a pocket is then formed in the flexible flat structure which is open in the direction of travel and/or in the direction of the cargo space structure, which can be filled by the air flow. This stiffens the pocket and stabilizes the airfoil present in the flexible flat structure.

Advantageously, the pocket is formed by an upper sail and a lower sail. The upper sail is joined together with the lower sail at the leeward side. The upper sail and lower sail should likewise be joined together at the windward side, and the open pocket preferably has a fill opening arranged between upper sail and lower sail.

The fill opening can be held open by means of struts, so that for example even when the upper and lower sail are wet a filling of the pocket will occur and the airfoil can be formed.

Advantageously, the air conduction duct has a conically tapering section starting from the air inlet opening in the direction of the air outlet opening.

In this way, in addition to the lift effect of the cover a back pressure is advantageously built up inside the air conduction duct and accomplishes a maximum internal cross section for it.

Advantageously, the air conduction duct has a variable cross section in dependence on the position of the cover. At standstill or during slow driving of the load-carrying vehicle, the air conduction duct has its smallest cross section, and it may be entirely closed in the case of a cover formed from a flexible flat structure. The cover then lies entirely on the cargo space structure or clings to it.

BRIEF DESCRIPTION OF THE DRAWINGS

For better understanding, the invention shall be explained more closely below with the aid of four figures. There are shown.

DETAILED DESCRIPTION OF THE INVENTION

Figure 1:
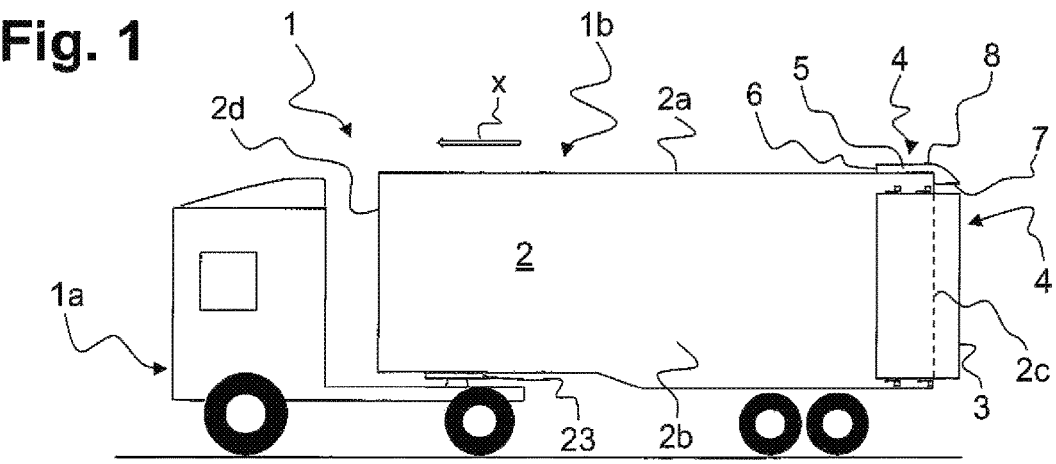
FIG. 1: a side view of a load-carrying vehicle with several air conduction elements arranged in the rear region of a load-carrying vehicle.

FIG. 1 shows a side view of a load-carrying vehicle 1 consisting of a tractor unit 1*a* and a semitrailer 1*b* releasably attached to it by means of a fifth wheel coupling 23. The semitrailer 1*b* comprises a cargo space structure 2, in which goods can be transported protected against external factors.

The cargo space structure 2 is formed by a roof wall 2*a*, two opposite side walls 2*b* extending in the direction of travel x, a front wall 2*d* bounding off the cargo space structure 2 from the tractor unit 1*a* in the direction of travel x and a rear wall 2*c*. In particular, the rear wall 2*c* can be provided with swiveling doors (not shown) for loading and unloading.

In the rear region 3 of the cargo space structure 2 are located one air conduction element 4 each on the roof wall 2*a* and on the side walls 2*b*. Each of the three air conduction elements 4 has an air conduction duct 5 oriented in the direction of travel x with an air inlet opening 6 located in the direction of travel x and an air outlet opening 7 situated at the opposite end. The air outlet opening 7 should be formed with a larger cross section as compared to the air conduction duct 5 and also the air inlet opening 6. This accomplishes a diffuser effect with a decreased speed of the air flowing through the air conduction element 4 while at the same time increasing its pressure. The air outlet opening 7 furthermore lies inside the cross section contour of the cargo space structure 2 and thus in a region in which a negative pressure is formed during driving operation. The orientation of the air outlet opening 7 lies basically in the same plane as the direction of travel x.

The air conduction elements 4 in the representation of FIG. 1 are in a raised position with respect to the cargo space structure 2, that is, during fast driving of the load-carrying vehicle 1.

Figure 2:
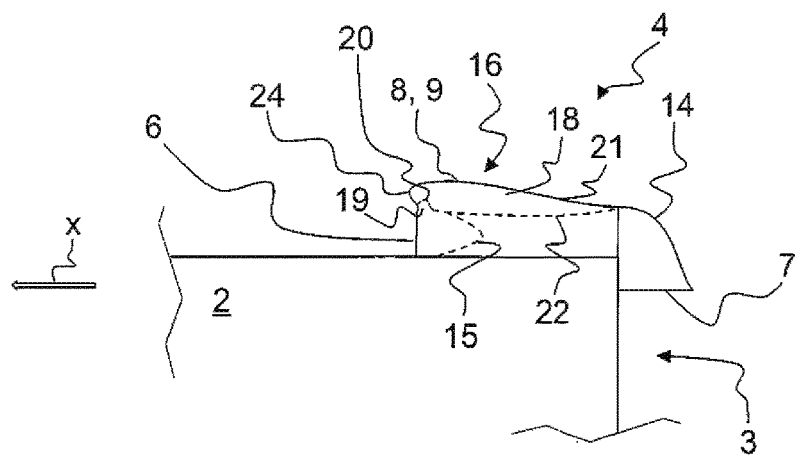
FIG. 2: an enlarged side view of the air conduction element according to FIG. 1.
Figure 3:
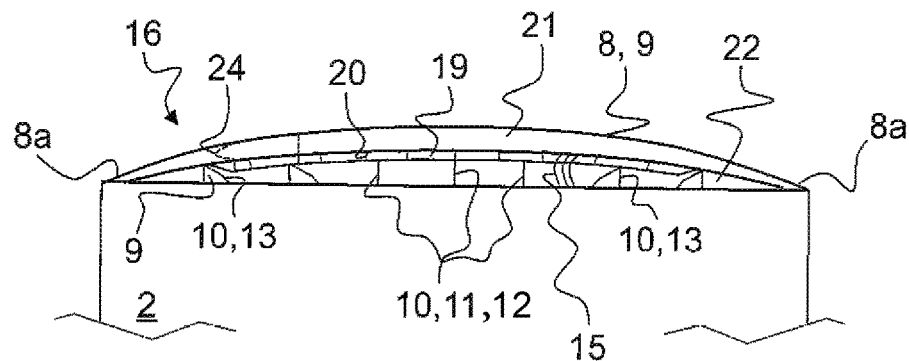
FIG. 3: a front view of an air conduction element according to FIG. 2 and FIG. 4: a top view of an air conduction element according to FIGS. 1 to 3.

In the representations of FIG. 2 and FIG. 3, the air conduction element 4 is shown in detail with a cover 8 formed as an airfoil 16, wherein the cover 8 is made from a flexible flat structure 9 and the airfoil 16 is blown open after going beyond the required air speed. The cover 8 preferably has an upper sail 21 and a lower sail 22, which are joined together at the end opposite the direction of travel x and thereby form a pocket 18. At the end of the pocket 18 situated in the direction of travel x the upper sail 21 is folded down by as much as 180° and thereby forms an onflow edge 24, which in turn is connected to the lower sail 22. For the greater portion of the width of the cover 8 a fill opening 19 is situated between the onflow edge 24 and the lower sail 22, through which air flows into the pocket 18 and stiffens the cover 8 in the side regions by a back pressure effect.

In order to ensure a lifting of the cover 8 especially when wet and when the flexible flat structure 9 is clinging to the cargo space structure 2, the fill openings 19 may be held open by struts 20. These should be made of a flexible material, such as plastic or wire, and should engage with the upper sail 21 and the lower sail 22 on both sides of the fill opening 19.

Furthermore, a lifting of the cover 8 may be improved by supporting the onflow edge 24 of the cover 8 by means of elastic clasps 15 with respect to the cargo space structure 2 and thereby holding open the air inlet opening 6 at least partly. For reasons of clarity, only three elastic clasps 15 are indicated in FIG. 3; in practice, however, a plurality of elastic clasps 15 should be arranged distributed over the entire width of the fill opening 19.

In the representation of FIG. 3, the upper sail 21 and the lower sail 22 are each connected to the cargo space structure 2. However, it would likewise be possible to join together the upper sail 21 and the lower sail 22 in lateral end sections 8a of the cover 8 and then join the respective end section 8a to the cargo space structure 2 as a single layer.

Between lower sail 22 and roof wall 2a it is possible to provide ribs 13 as spacing elements 10 running substantially in the direction of travel x, being advisedly made also of a flexible flat structure 9. The ribs 13 thereby enable a vertical movement of the cover 8 between a lowered and a raised position. The ribs 13 also serve for the fastening of the cover 8 to the cargo space structure 2. In place of or in addition to the ribs 13, belts 11 may also be used as spacing elements 10, which can support extremely high loads and furthermore are not subject to twisting.

The spacing element 10 may also alternatively be formed as a cable 12, which is preferably arranged in the region of the air inlet opening 6. The cable 12 provides lower air resistance, but only enables a pointlike bearing of the load as compared to a rib 13 extending in a line.

The difference in level of the air conduction duct 5 between the air inlet opening 6 and the air outlet opening 7 is bridged by means of the apron 14, which is arranged on the cover 8. The apron 14 is also made from a flexible flat structure 9 and thereby allows the vertical movement of the cover 8.

Figure 4:
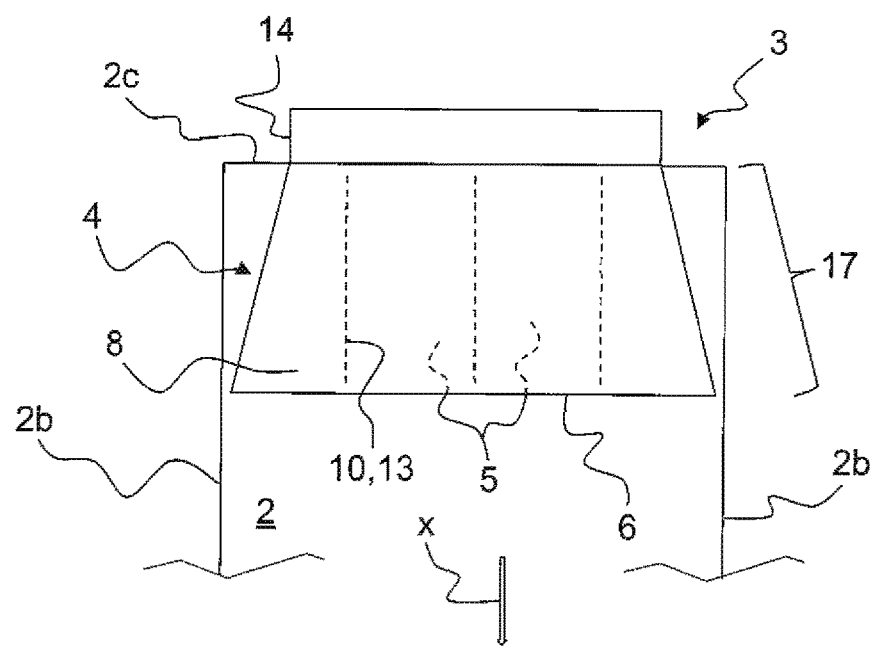

FIG. 4 shows an air conduction element 4 in top view, wherein the cover 8 has a conically tapering section 17 opposite the direction of travel x. This serves to build up a back pressure beneath the cover 8 and thereby assist the raising of the cover 8.

LIST OF REFERENCE SYMBOLS

1 Load-carrying vehicle
1a Tractor unit
1b Semitrailer
2 Cargo space structure
2a Roof wall
2b Side wall
2c Rear wall
2d Front wall
3 Rear region of cargo space structure
4 Air conduction element
5 Air conduction duct
6 Air inlet opening
7 Air outlet opening
8 Cover
8a Lateral end section
9 Flexible flat structure
10 Spacing element
11 Belt
12 Cable
13 Rib
14 Apron
15 Elastic clasps
16 Airfoil
17 Conical section
18 Pocket
19 Fill opening
20 Struts
21 Upper sail
22 Lower sail
23 Fifth wheel coupling
24 Onflow edge
x Direction of travel

What is claimed is:

1. An air conduction element for reducing air resistance of a load-carrying vehicle having a cargo space structure, which can be externally mounted in a rear region of the cargo space structure and comprises an air conduction duct with a front air inlet opening and a rear air outlet opening in a direction of travel (x), wherein the air inlet opening overlaps the cargo space structure in the direction of travel (x) and the air outlet opening is arranged behind the cargo space structure within its cross section contour, wherein the air conduction element comprises a cover which delimits the air conduction duct, wherein the cover is produced from a flexible flat structure, and wherein elastic clasps are arranged in the air inlet opening, running from the cover to the cargo space structure.

2. The air conduction element as claimed in claim 1, wherein the cover is held by spacing elements on the cargo space structure.

3. The air conduction element as claimed in claim 2, wherein the spacing elements engage with the cover and the cargo space structure.

4. The air conduction element as claimed in claim 2, wherein the spacing elements are formed from belts or cables.

5. The air conduction element as claimed in claim 2, wherein the spacing elements are ribs extending in the direction of travel (x).

6. The air conduction element as claimed in claim 5, wherein the ribs are made from the flexible flat structure.

7. The air conduction element as claimed in claim 1, wherein an apron is secured on the cover extending as far as the air outlet opening.

8. The air conduction element as claimed in claim 7, wherein the apron is made from the flexible flat structure.

9. The air conduction element as claimed in claim 1, wherein the cover is formed with an airfoil.

10. The air conduction element as claimed in claim 9, wherein the airfoil is formed by the flexible flat structure.

11. The air conduction element as claimed in claim 10, wherein a pocket is formed in the flexible flat structure open in the direction of travel (x) and/or in the direction of the cargo space structure, which may be filled by the air flow.

12. The air conduction element as claimed in claim 11, wherein the pocket is formed by an upper sail and a lower sail.

13. The air conduction element as claimed in claim 12, wherein the pocket comprises a fill opening which is arranged between the upper sail and lower sail.

14. The air conduction element as claimed in claim 13, wherein the fill opening is held open by struts.

15. The air conduction element as claimed in claim 1, wherein the air conduction duct has a conically tapering section starting at the air inlet opening in the direction of the air outlet opening.

16. The air conduction element as claimed in claim 1, wherein the air conduction duct has a variable cross section in dependence on the position of the cover.

17. The air conduction element as claimed in claim 3, wherein the spacing elements are ribs extending in the direction of travel (x), wherein the ribs are made from the flexible flat structure, and wherein an apron is secured on the cover extending as far as the air outlet opening.

18. The air conduction element as claimed in claim 17, wherein the apron is made from the flexible flat structure, wherein the cover is formed with an airfoil, and wherein the airfoil is formed by the flexible flat structure.

19. The air conduction element as claimed in claim 18, wherein a pocket is formed in the flexible flat structure open in the direction of travel (x) and/or in the direction of the cargo space structure, which may be filled by the air flow, wherein the pocket is formed by an upper sail and a lower sail, wherein the pocket comprises a fill opening which is arranged between the upper sail and lower sail, wherein the fill opening is held open by means of struts; and wherein the air conduction duct has a conically tapering section starting at the air inlet opening in the direction of the air outlet opening.

* * * * *